United States Patent [19]

Bryan-Brown et al.

[11] Patent Number: 5,724,113
[45] Date of Patent: Mar. 3, 1998

[54] LIQUID CRYSTAL DEVICE ALIGNMENT LAYER HAVING AN ASYMMETRIC PROFILE GRATING ON ITS SURFACE

[75] Inventors: Guy Peter Bryan-Brown; Damien Gerard McDonnell; Michael John Towler, all of Malvern, United Kingdom

[73] Assignee: The Secretary of State for Defence in Her Britannic Majesty's Government of the United Kingdom of Great Britain and Northern Ireland, Hants, United Kingdom

[21] Appl. No.: 687,494

[22] PCT Filed: Jan. 30, 1995

[86] PCT No.: PCT/GB95/00177

§ 371 Date: Aug. 6, 1996

§ 102(e) Date: Aug. 6, 1996

[87] PCT Pub. No.: WO95/22075

PCT Pub. Date: Aug. 17, 1995

[30] Foreign Application Priority Data

Feb. 9, 1994 [GB] United Kingdom ............... 9402516

[51] Int. Cl.⁶ ............................ G02F 1/1337; G02F 1/13
[52] U.S. Cl. ........................ 349/123; 349/124; 349/201
[58] Field of Search ................................. 349/123, 124, 349/127, 201

[56] References Cited

U.S. PATENT DOCUMENTS

| | | | |
|---|---|---|---|
| 5,013,141 | 5/1991 | Sakata | 349/201 |
| 5,299,289 | 3/1994 | Omae et al. | 349/201 |
| 5,311,339 | 5/1994 | Fertig et al. | 349/76 |
| 5,464,669 | 11/1995 | Kang et al. | 349/124 |

FOREIGN PATENT DOCUMENTS

| | | |
|---|---|---|
| 60-60624 | 4/1985 | Japan |
| 63-27815 | 2/1988 | Japan |
| 1-238619 | 12/1989 | Japan |

OTHER PUBLICATIONS

Japanese Journal of Applied Physics, Part 1, vol. 31, No. 7, Jul. 1992, JP pp. 2155–2164, Schadt et al 'Surface-induced parallel alignment of liquid crystals by linearly polymerized photopolymers'.

Molecular Materials, UK, vo. 3, No. 2, 1993 pp. 161–168, Marusii et al. 'Photosensitive orientants for liquid crystal alignment'.

Society for Information Display, International Symposium, Digest of Technical Papers, vo. XXIV, May 1993 pp. 957–960, Lee et al; 'Control of the LC alignment using a stamped morphology method and its application to LCDs'.

Primary Examiner—William L. Sikes
Assistant Examiner—Walter J. Malinowski
Attorney, Agent, or Firm—Nixon & Vanderhye P.C.

[57] ABSTRACT

The invention provides a liquid crystal device having an aligned and surface tilted liquid crystal layer contained between two cell walls. The cell walls carry electrodes for applying voltages across the layer thickness to provide a display. The alignment is provided by a layer of a material that undergoes optically induced ordering during cross linking. That is, a material capable of aligning liquid crystal molecules after cross linking with polarized light. One such material is polyvinylcinnamate. The aligning layer is profiled with an asymmetric grating, eg approximately sawtooth in cross section by interferometer, oblique incidence photolithography, or embossing. The shape of the grating provides the surface tilt. The liquid crystal material may be nematic, cholesteric, or smectic.

19 Claims, 3 Drawing Sheets

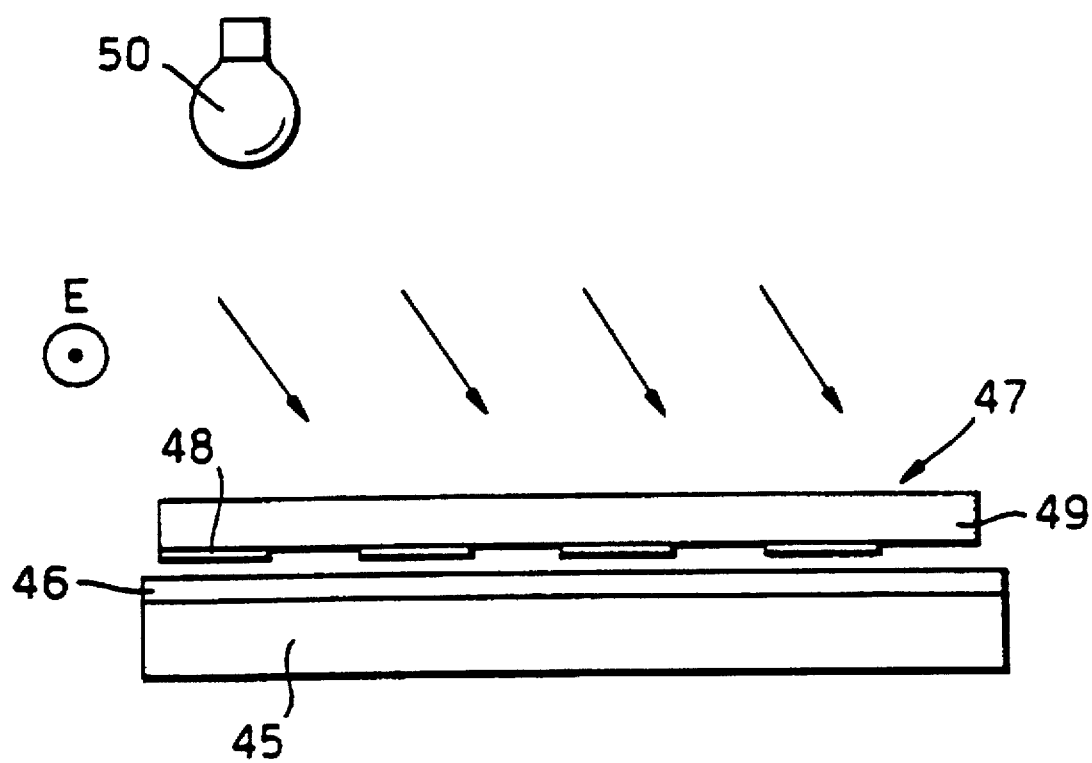

LIQUID CRYSTAL DEVICE ALIGNMENT LAYER HAVING AN ASYMMETRIC PROFILE GRATING ON ITS SURFACE

BACKGROUND OF THE INVENTION

1. Field of the Invention

This invention relates to liquid crystal device alignment. Such devices typically comprise a thin layer of a liquid crystal material contained between cell walls. Optically transparent electrode structures on the walls allow an electric field to be applied across the layer causing a re-ordering of the liquid crystal molecules to an ON state. On removing the electric field the molecules relax back to their OFF state.

There are three known types of liquid crystal material, nematic, cholesteric, and smectic each having a different molecular ordering.

2. Description of Prior Art

The present invention particularly concerns devices using nematic or long pitch cholesteric materials and a surface alignment treatment to the cell walls. This surface alignment aligns liquid crystal molecules in contact with the wall in an alignment direction. By arranging these alignment directions orthogonal the liquid crystal is forced to adopt a twisted structure in its voltage OFF state. This device is known as a twisted nematic device. Addition of a small amount of cholesteric material to the nematic material imparts a preferred twist direction to ensure a uniform twist in the device. Also devices can be made with angles of twist greater than 90°; eg the super twisted nematic device, or 270° twisted nematic device described in U.S. Pat. No. 4,596,446. Another requirement for the alignment treatment is that it should also impart a surface tilt to liquid crystal molecules at the cell wall. Such a surface tilt is necessary in some devices to ensure a uniform display as described eg in GB-1,472,247, and 1,478,592.

One method of providing alignment is termed a rubbing process where a cell wall, with or without a polymer layer, is unidirectionally rubbed by a soft cloth. Liquid crystal molecules align along the rubbing direction, usually with a surface tilt of about 2° or more depending upon the polymer layer.

Another alignment technique is known as oblique evaporation of eg SiO, which can produce surface tilts of zero, or high tilt eg 30° depending upon evaporation direction angle. Such a technique is cumbersome for large scale manufacture; but a more important problem is that it is difficult to provide a uniform alignment direction and surface tilt over large areas of cell walls.

Short pitch cholesteric materials, forming thermochromic displays, have been aligned by grating structures embossed into plastic cell walls; this is described in GB-2,143,323 (McDonnell 1983). A previous use of gratings to obtain pretilted alignment has utilised a blazed grating crossed with a sinusoidal grating (E S Lee et al SID 93 Digest, 957). The liquid crystal director then runs along the sinusoidal grooves and hence runs over the blazed grooves which leads to pretilt. One method of producing blazed gratings using a photosensitive layer exposed by a two beam interference fringe, is described in Jp-A-60 060 624.

Other alignment techniques include the use of the Langmuir Bloggett technique (H Ikeno et al Japan J Appl Phys Vol 27, pp 495, 1988); application of magnetic field to the substrate (N Koshida and S Kikui, Appl Phys Lett vol 40, PP 541, 1982); or the use of polymers films having optical anisotropy induced by mechanical drawing (H Aoyama et al Mol Cryst Liq cryst vol 72 pp 127, 1981). Also twisted nematic structures have been made in which only one surface is rubbed (Y Toko et al Japan Display 92 491).

A variation on rubbed polymer alignment is described by M Schadt, K Schmitt, V Kozinkov and V Chigrinov, Jpn J Appl Phys 31, 2155 (1992). The material polyvinylcinnamate when illuminated with polarised light forms a cross linked structure with an anisotropic distribution. This anisotropy leads to a preferred azimuthal direction for liquid crystal alignment on the surface. The direction of the nematic director is perpendicular to the polarisation of the light used to cross link the surface, and with zero surface tilt (pretilt).

For most liquid crystal devices a molecular surface tilt is essential for correct operation of display devices.

SUMMARY OF THE INVENTION

The problem of zero surface tilt in an ordered polymer alignment layer, is solved according to this invention, by surface profiling the cross linked layer with a blazed (asymmetric) grating structure.

According to this invention a method of providing a surface alignment and surface molecular tilt comprises the steps of:

- forming a layer of material capable of being cross linked on the surface of a liquid crystal cell wall,
- illuminating the layer with polarised light to anisotropically cross link the layer,
- forming an asymmetric grating in the cross linked layer so that liquid crystal molecules in contact with the layer will be both aligned and tilted to the plane of the cell wall.

The material may be a polymer, oligmer, or monomer whose molecular weight is increased by exposure to UV light, and which is preferably compatible with plastic and glass cell walls.

Grooves forming the grating may be aligned along the polarisation direction of the polarising light, or at a non-zero angle thereto.

The polarisation of the polarised light may be varied from linear to an amount of elliptically polarised light. The amount of ellipticity varies the azimuthal anchoring energy, ie the strength of alignment direction.

According to this invention a liquid crystal device comprises:

- two spaced cell walls carrying electrodes structures on both opposing surface to form pixels at electrode intersections and aligning layers on at least one opposing surface,
- a layer of a liquid crystal material enclosed between said walls. Characterised by,
- a layer of anisotropic cross linked aligning material providing alignment of liquid crystal molecules, and
- an asymmetric profiled grating on the surface of the aligning layer,
- the arrangement being such that the aligning layer aligns liquid crystal molecules in a desired direction and with a surface molecular tilt.

The amount of surface tilt is determined by the angles and depths of grooves forming the grating.

The asymmetric alignment may have the approximate cross sectional shape of a sawtooth waveform.

The asymmetric alignment surface may be defined as a surface for which there does not exist a value of h such that:

$$Y(h-x)=Y(h+x) \quad (1)$$

for all values of x, where Y is the function describing the surface amplitude.

The liquid crystal material may be a nematic, long pitch cholesteric, cholesteric, or smectic including ferroelectric liquid crystal material, with or without dyes.

The device may be formed into twisted nematic devices with eg 90° twist angle, or super twisted nematics with eg 270° twist angles. The twisted nematic devices may be multiplex addressed in conventional manner or addressed by an active matrix array employing thin film transistors at each addressable pixel. Alternatively ferroelectric devices eg surface stabilised ferroelectric (bistable devices) liquid crystal devices may be formed.

One or both cell walls may be formed of a relatively thick non flexible material such as a glass, or one or both cells walls may be formed of a flexible material such as a thin layer of glass or a plastic material eg polypropylene. A plastic cell wall may be embossed on its inner surface to provide a grating. Additionally, the embossing may provide small pillars (eg of 1–3 µm height and 5–50 µm or more width) for assisting in correct spacing apart of the cell walls and also for a barrier to liquid crystal material flow when the cell is flexed. Alternatively the pillars may be formed by the material of the alignment layers.

BRIEF DESCRIPTION OF THE DRAWINGS

The invention will now be described, by way of example only, with reference to the accompanying drawings of which:

FIG. 6 is a stylised view of alternative apparatus for producing asymmetric alignment.

DETAILED DISCUSSION OF PREFERRED EMBODIMENTS

Figure 1:
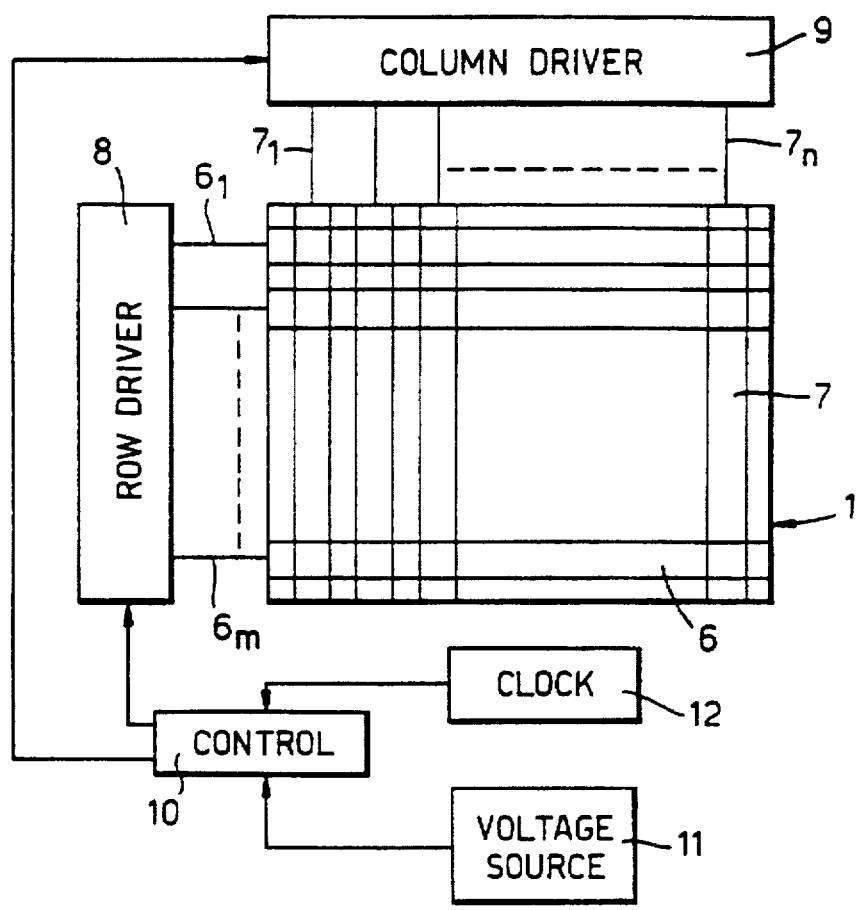
FIG. 1 is a plan view of a matrix multiplex addressed liquid crystal display.
Figure 2:
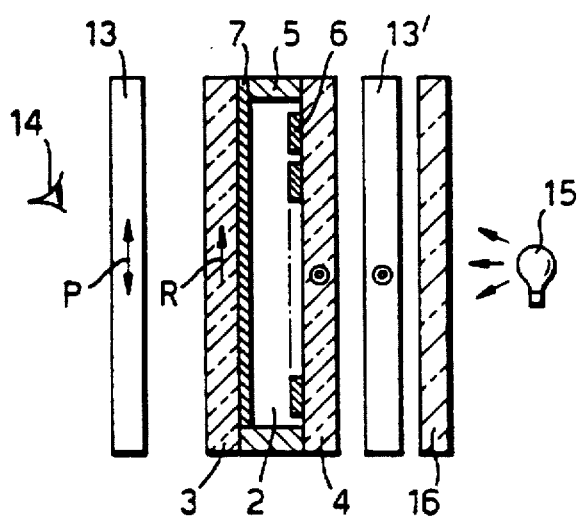
FIG. 2 is a cross section of the display of FIG. 1.

The display of FIGS. 1, 2 comprises a liquid crystal cell 1 formed by a layer 2 of nematic or long pitch cholesteric liquid crystal material contained between glass walls 3, 4. A spacer ring 5 maintains the walls typically 6 µm apart. Additionally numerous 6 µm diameter glass beads may be dispersed in the liquid crystal material to maintain an accurate wall spacing. Strip like row electrodes 6 eg of $SnO_2$ or ITO are formed on one wall 3 and similar column electrodes 7 formed on the other wall 4. With m-row and n-column electrodes this forms an m.n matrix of addressable elements or pixels. Each pixel is formed by the intersection of a row and column electrode.

A row driver 8 supplies voltage to each row electrode 6. Similarly a column driver 9 supplies voltages to each column electrode 7. Control of applied voltages is from a control logic 10 which receives power from a voltage source 11 and timing from a clock 12.

Either side of the cell 1 are polarisers 13, 13' arranged with their polarisation axis crossed with respect to one another and parallel to an alignment direction on the adjacent wall 3, 4 as described later.

A partly reflecting mirror 16 may be arranged behind the cell 1 together with a light source 15. These allow the display to be seen in reflection and lit from behind in dull ambient lighting. For a transmission device, the mirror may be omitted.

Figure 3:
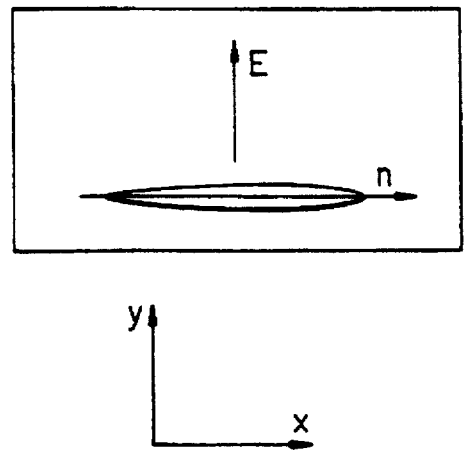
FIG. 3 is a stylised plan view of a cell wall showing polarisation direction and orientation of a nematic alignment direction.

Prior to assembly the cell walls 3, 4 are surface alignment treated. A layer of polyvinylcinnamate when cross linked by polarised light produces an ordered structure which aligns liquid crystal material. As shown in FIG. 3 liquid crystal molecular alignment direction n is orthogonal to polarisation direction E. Direction n lies along an x axis whilst E lies along a y axis, and liquid crystal layer thickness lies in a z direction, normal to the cell wall. It is necessary to produce a surface tilt so that molecules do not lie in the x, y plane as in FIG. 3, but at some angle eg 2° to 20° or more.

It is possible to now add pretilt by the use of a blazed modulated surface. It can be shown that pretilt is obtained when a nematic director lies in a direction perpendicular to the grooves of a blazed grating. This condition can be satisfied if a blazed grating is written into the surface of the polyvinylcinnamate such that the groove direction is along y. The nematic director n then lies across the grooves (in the x direction) and pretilt is obtained. In this context a blazed surface is defined as above.

In practice the grating can be written at the same time as the polymerisation process as explained below.

Figure 4:
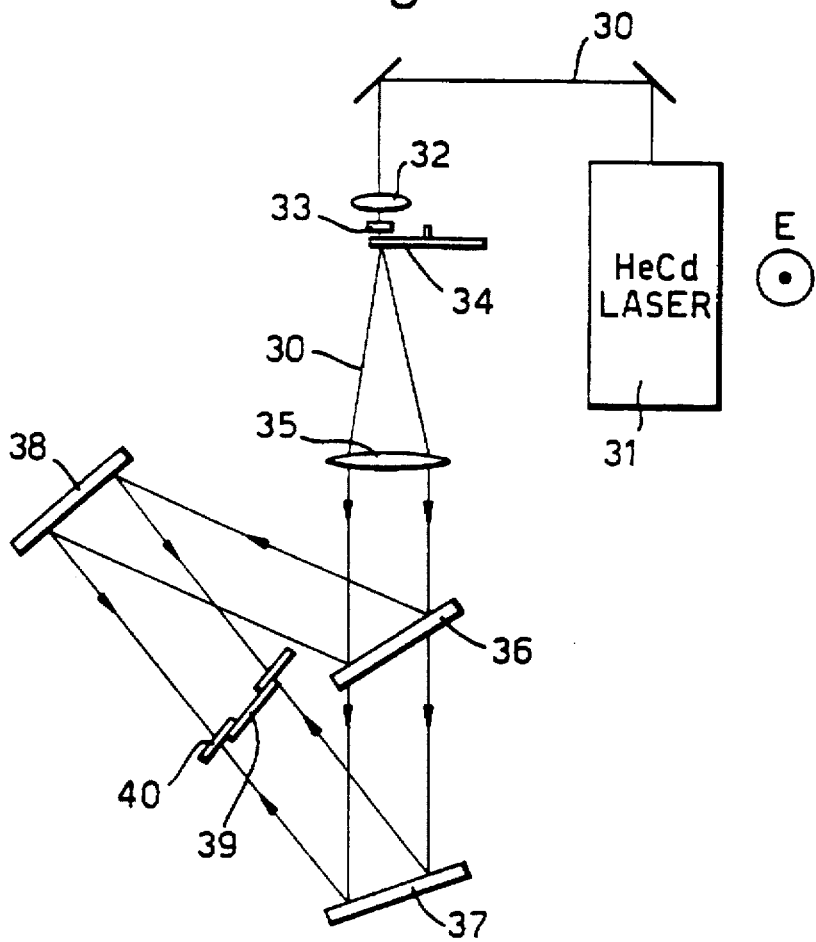
FIG. 4 is a diagrammatic view of apparatus for producing the asymmetric alignment.

FIG. 4 shows apparatus for producing a grating. As shown light 30 from a linearly polarised HeCd laser 31 (of wavelength 325 nm) is focused by a first lens 32 onto a fixed diffuser 33 and a rotating diffuser 34. A second lens 35 recollimates the now expanded laser beam 30 which is then amplitude split by a semi aluminised beamsplitter 36 onto two mirrors 37, 38. A substrate 39 to be formed into a grating is mounted in a sample holder 40 located between the two mirrors 37, 38. The counterpropagating beams in between the two mirrors 37, 38 set up an optical standing wave, ie interference fringes, having a period of half the laser wavelength. To form the correct polymer chain direction, the laser beam polarisation E is along the direction of the grating grooves, out of the page in FIG. 4.

Prior to being mounted in the sample holder 40 a substrate 39 of indium tin oxide (ITO) coated glass is cleaned in acetone and isopropanol and then spin coated with a polyvinylcinnamate 2% solution in chlorobenzene and dichioromethane (50=50 solution) at 3000 rpm for 30 seconds to give a coating 41. Softbaking is carried out at 90° C. for 60 minutes. The substrate 39 is then mounted in the sample holder 40 as in FIG. 4 and exposed at an oblique angle to a standing wave pattern of light from the laser 31. This is a specific example of interferographic grating manufacture, M C Hutley, Diffraction Gratings (Academic Press, London 1982) pp 95–125.

Figure 5:
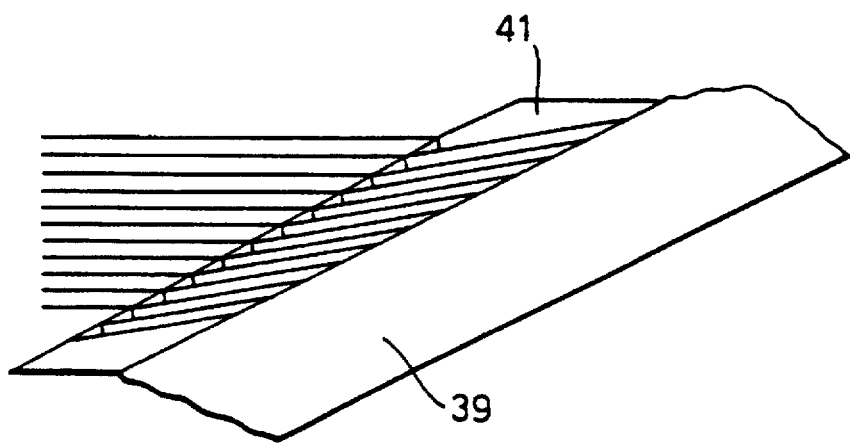
FIG. 5 is a section view of a cell wall being treated by the apparatus of FIG. 4.

The interference fringes are recorded into the photopolymer layer 41 as shown in FIG. 5. The pitch of the grating depends on the angle between the substrate 39 and the standing wave. Typical exposure is 300 seconds with a power density at the sample of 1.5 mW/cm$^2$. The sample is spin developed for 15 seconds in chlorobenzene and then rinsed in isopropanol.

A second method of grating manufacture is shown in FIG. 6. In this case the grating pattern is formed by an exposure to linearly polarised light from a mercury lamp through a photolithography mask. As shown a cell wall 45 is coated with a layer 46 of photopolymer. A mask 47 is formed by a chrome pattern 48 on a glass slide 49. Linearly polarised light is provided by a mercury lamp 50, polarisation direction is indicated by E. The off axis illumination ensures that blazed grooves are obtained (after development in chlorobenzene). The illumination polarisation must again have its electric vector along the direction of the grooves.

Both the above methods use light sources within the optically sensitive regime of polyvinylcinnimate (300–350 nm). Other possible fabrication processes could include direct writing laser lithography or embossing, or carrier layer transfer.

The configuration described in this application can in principle be applied to any material which undergoes optically induced ordering during polymerisation. Also in terms of liquid crystal alignment, the azimuthal anchoring strength of the polymer layer (which is usually strong) can be reduced by using elliptically polarised light instead of linearly polarised light. This is due to reduced ordering along the x direction. Furthermore pretilt can be varied independently of the anchoring strength as the former is only a function of the topology.

The zenithal anchoring energy may also be controlled by varying the grating material, and or by use of a surfactant (eg lethecin) on the grating surface.

The gratings 41 may cover the entire surface of a cell wall, or may cover all or part of each pixel, or may extend slightly beyond the boundary of the pixels. The gratings may be at the pixel areas of a complete layer of grating material with the areas between pixels coated with a polymer whose surface contains no grating and or has not been cross-linked. Alternatively the gratings at the pixels may be separate areas of a grating with no grating polymer between the pixels. Areas between pixels with no grating may be used to improve contrast ratio between ON and OFF states of a display, because these non-grating areas will appear black in a normally white twisted nematic display. This dispenses with the need to apply a black coloured pattern to cell walls between electrodes, as formed on some present displays.

The direction of the grooves at each pixel may be different in different parts of the pixel, or between adjacent pixels, eg two half pixels with grooves orthogonal to one another. Furthermore, the asymmetry of the grooves and or depth of groove may be varied within a pixel area (and hence surface pretilt) to allow additional grey scale capability, particularly for STN devices (twist angles between 180° and 360°, eg 270°). This sub-pixellation may be used to improve the viewing angle of a display.

The tilted alignment described above may also be used in smectic and cholesteric liquid crystal devices.

We claim:

1. A method of providing a surface alignment and surface molecular tilt on walls (3.4.41.46) of liquid crystal devices (1) comprising the steps of:
    forming a layer (41, 46) of material capable of being cross linked on the surface of a liquid crystal cell wall (3, 4, 41, 46),
    illuminating the layer (41, 46) with polarised light to anisotropically cross link the layer,
    forming an asymmetric grating in the cross linked layer (41, 46) so that liquid crystal molecules (2) in contact with the layer (41, 46) will be both aligned and tilted to the plane of the cell wall (3, 4, 41, 46).

2. The method of claim 1 wherein the grating is formed by interferometery or oblique incidence photolithography using the polarised light.

3. The method of claim 1 wherein the polarised light is linearly polarised light.

4. The method of claim 1 wherein the polarised light is elliptically polarised light.

5. The method of claim 1 wherein grooves in the grating (41, 46) are aligned along or at a non zero angle to the polarisation axis of the polarised light.

6. The method of claim 1 wherein the profile of the grating (41, 46) is varied to vary surface tilt.

7. A liquid crystal device comprising:
    two spaced cell walls (3, 4), each wall carrying an electrode structure (6, 7) on a wall surface, said electrode structure located on opposing wall surfaces to form pixels at electrode (6, 7) intersections and an aligning layer (41, 46) on at least one opposing surface (3, 4),
    a layer (2) of a liquid crystal material enclosed between said walls (3, 4),
    characterised by a layer of anisotropic cross linked aligning material (41, 46) providing alignment of liquid crystal molecules, and
    an asymmetric profiled grating on the surface of the aligning layer (41, 46),
    the arrangement being such that the aligning layer (41, 46) aligns liquid crystal molecules in a desired direction and with a surface molecular tilt.

8. The device of claim 7 wherein the asymmetric profiled grating (41, 46) is formed at electrode (6, 7) interesections forming pixels, with the gaps therebetween containing no grating.

9. The device of claim 7 wherein the asymmetric profiled grating (41, 46) direction is different in different areas of each pixel or at adjacent pixels.

10. The device of claim 7 wherein the asymmetry of the asymmetric profiled grating (41, 46) is different in different areas of each pixel or at adjacent pixels.

11. The device of claim 7 wherein the depth of grooves in the asymmetric profiled grating (41, 46) is different in different areas of each pixel or at adjacent pixels.

12. The device of claim 7 wherein the asymmetric profiled grating (41, 46) is coated with a surfactant.

13. The device of claim 7 wherein the liquid crystal material (2) is nematic, cholesteric, or smectic liquid crystal material.

14. The device of claim 7 and including (polarisers 13, 13') arranged to cooperate with the alignment directions (R) on the cell walls (3, 4) to produce maximum contrast between two switched states of the liquid crystal material (2).

15. The device of claim 7 and including means (8, 9, 10, 11, 12) for applying addressing voltages to the cell electrodes (6, 7).

16. The device of claim 7 wherein the cell walls (3, 4) are formed of a glass material.

17. The device of claim 7 wherein the cell walls (3, 4) are formed of a flexible plastic material.

18. The device of claim 7 wherein spacer pillars are formed on one or both cell walls (3, 4).

19. The device of claim 7 wherein spacer pillars are formed by the material (41, 46) forming the grating on one or both cell walls (3, 4).

* * * * *